(12) United States Patent
Tan (10) Patent No.: US 8,968,625 B2
(45) Date of Patent: Mar. 3, 2015

(54) PROCESS FOR BUILDING THREE-DIMENSIONAL OBJECTS

(76) Inventor: Yu En Tan, Singapore (SG)

( * ) Notice: Subject to any disclaimer, the term of this patent is extended or adjusted under 35 U.S.C. 154(b) by 457 days.

(21) Appl. No.: 13/511,280

(22) PCT Filed: Nov. 26, 2009

(86) PCT No.: PCT/SG2009/000457
§ 371 (c)(1),
(2), (4) Date: May 22, 2012

(87) PCT Pub. No.: WO2011/065920
PCT Pub. Date: Jun. 3, 2011

(65) Prior Publication Data
US 2012/0231175 A1 Sep. 13, 2012

(51) Int. Cl.
*B29C 41/02* (2006.01)
*B29C 67/00* (2006.01)
*G03G 15/22* (2006.01)

(52) U.S. Cl.
CPC ......... *B29C 67/0074* (2013.01); *B29C 67/0077* (2013.01); *G03G 15/224* (2013.01)
USPC ............ 264/439; 264/104; 264/113; 264/317

(58) Field of Classification Search
CPC .................................................. B29C 67/0077
USPC .......... 264/104, 113, 308, 317, 437, 438, 439
See application file for complete search history.

(56) References Cited

U.S. PATENT DOCUMENTS 6,066,285 A * 5/2000 Kumar .......................... 264/439
6,376,148 B1 * 4/2002 Liu et al. .................... 430/124.4
6,780,368 B2 * 8/2004 Liu et al. .................. 264/308 X

* cited by examiner

*Primary Examiner* — Leo B Tentoni (57) ABSTRACT

A process for building three-dimensional objects based on electrophotographic printing is disclosed, comprising the steps of depositing a first layer of powdered base material on a substrate, operating an imaging member, a charging device, an image generating device and an image developing device, in that order, to deliver and deposit filler material onto the layer of powdered base material in an image-wise manner to produce a layer of bonded base material that correspond to the first cross-section of the three-dimensional object being built, repeating all the above steps for as many times as required to form successive layers that constitute the three-dimensional object, said filler material further causing adjacent layers to be bonded with one another; and removing unbonded material to cause the three-dimensional object to appear.

31 Claims, 4 Drawing Sheets

PROCESS FOR BUILDING THREE-DIMENSIONAL OBJECTS

BACKGROUND OF THE INVENTION

This invention relates generally to the building of three-dimensional objects, and, more particularly, concerns an improved process for building three-dimensional objects based on electrophotograhic printing, wherein deformations found in completed three-dimensional objects caused by spillover effects of the building process are minimized.

The production of three-dimensional objects in an additive manner without the need for any tooling by numerous methods is well known. In such systems, a three-dimensional object is built layer-by-layer with each layer representing selected cross-sections thereof. Successive, adjacent layers representing corresponding successive, adjacent cross-sections of the object being built are formed and bonded together to produced the object involved.

One such system is described in U.S. Pat. No. 4,575,330. The system generates a three- dimensional object layer-by-layer in a process called stereolithography wherein a beam of UV laser is guided across the surface of a liquid UV-curable photopolymer according to a selected cross-section of that object. Areas exposed to the UV laser are polymerized and solidified to form a layer of solid plastic at or just below the surface. The completed layer is then lowered into the liquid UV-curable photopolymer and covered with a new layer of said liquid polymer and the laser shining step repeated for the generation of the next layer and, so on, until all the layers that make up the desired object is obtained.

Another alternative approach is described in U.S. Pat. No. 5,204,055. Powdered base material, such as a powdered ceramic or a powdered plastic is deposited in sequential layers one on top of the other. Liquid binder material is then selectively supplied to the layer of powdered base material using an ink-jet printing technique to bond the powdered base material together in accordance with a computer model of the three-dimensional object being formed. When all the layers composing the object are formed, unbounded powder is removed, resulting in the formation of the desired three-dimensional object.

The examples described hitherto, as well as many other systems that are in commercial use, are essentially point-to-point processes whereby three-dimensional objects are formed bit by bit, therefore the speed at which layers are formed is slower than if the layers are formed layer-by-layer. In view of this problem, there is considerable effort directed to designing systems which form three-dimensional objects layer-by-layer instead of bit by bit. U.S. Pat. No. 6,066,285, for example, discloses a method of solid freeform fabrication of a three-dimensional object using layer-by-layer deposition of at least one type of powder by electrophotographic printing. In an exemplary embodiment, a latent electrostatic image corresponding to a selected cross-section of the three-dimensional object to be formed is generated on an imaging member such as a photoconductor by applying light as a graphic pattern thereon. Thereafter, the latent electrostatic image is developed by depositing a part compositional powder and a support powder onto the surface of the imaging member whereon the part compositional powder adheres to the image portions of the latent image and the support powder adheres to the non-image portions of the latent image. The developed image is then transferred from the imaging member to a substrate. Subsequent layers are also formed in the same manner and deposited directly onto the previously deposited layer. The process is repeated until the three-dimensional object is fully formed.

A method is described in U.S. Pat. No. 6,376,148 which operates in substantially the same manner as described herein with reference to U.S. Pat. No. 6,066,285. In one preferred embodiment, a first layer of primary body-building powder material is deposited on a support platform and an electrophotographic printing means is operated to create a transferable binder powder image in accordance with the three-dimensional object. The transferable binder image, containing heat fusible materials, is then transferred to the layer of body-building material, melted, and allowed to permeate therethrough. Thereafter, the molten binder is hardened by cooling it to a temperature below its melting point. As the molten binder material solidifies, it bonds body-building material around it together to form a first cross-section of the three-dimensional object. Areas free of the binder material remain unbonded and stay as support material for subsequent layers. After that, a second layer of body-building powder material is deposited on the first layer and the step of generating and transferring a binder powder image is repeated to form a second layer of the three-dimensional object. Subsequent layers are formed in the same manner to produce the three-dimensional object.

The method and apparatus disclosed in U.S. Pat. No. 6,376,148 has several advantages. For one, the method builds three-dimensional objects more quickly than prior art systems as each layer of the object is built wholly whereas most prior art systems build objects in a point-by-point fashion. Also, the method has the advantage of being able to use a board array of materials, including both organic and inorganic substances as well as their mixtures, as the primary body-building powder. In contrast, some prior art systems like the one described hereinbefore with reference to U.S. Pat. No. 4,575,330, can use only one type of build material—photo-curable liquid resins. Further, numerous prior art electrophotographic printing based systems, such as the one described herein with reference to U.S. Pat. No. 6,066,285, shape each body-building layer via electrostatic attraction of the body-building powder material to the imaging member in an image-wise manner responsive to the electrostatic latent image thereon. The amount of material that can be deposited on the imaging member is dependent on the strength of the attractive force exerted by the imaging member on the body-building powder material which is dependent on the charge potential of the surface of the imaging member. Therefore, should adjustment to the thickness of the body-building material layer be desired, the imaging member must be charged to a different level than usual. However, electrical discharge from the imaging member, in the form of sparks, may occur if the voltage potential of said imaging member is increased to the point of air breakdown or ionization of air. Accordingly, the amount of body-building material that can be deposited in each layer forming step is limited. By contrast, the method and apparatus disclosed in U.S. Pat. No. 6,376,148 does not have this shortcoming as it performs the layer forming step in two separate steps, wherein the first is the deposition of the body-building powder material by conventional powder dispensing means and the second is the deposition of the binder material by electrophotographic printing. As such, thicker layers can be produced since a big portion of the materials needed in each layer is deposited in the first step, with the remaining coming from the second.

Another advantage associated with this method and apparatus is that the step of generating support structures for objects with features that are not self-supporting, like undercuts or overhangs, is unnecessary, as unbonded body-building powder material adjacent those that are bonded to form the three-dimensional objects, is retained in their original position throughout the build process and forms a natural support system for the objects that are being built. Lastly, the invention provides an apparatus that, through the use of mature technologies, including that of electrophotographic printing, is simple in design, efficient, and economical.

However, problems with the invention of U.S. Pat. No. 6,376,148 do exist. In order to bond loose body-building powder material to form three-dimensional objects, heat is applied to a binder material containing heat fusible materials by heat sources positioned near the object building zone to melt the binder, and cause it to permeate the body-building powder layer. The step of applying the heat must be carefully modulated so that the heat applied to one layer of powder is not transmitted to other layers beneath, otherwise the binder material that had solidified in preceding layers may re-melt and flow in a random manner into surrounding regions, including layers below. Consequently, layers adversely affected by the heat will lose their definition and result in deformed objects.

Another disadvantage associated with the invention of U.S. Pat. No. 6,376,148 is that it does not provide a process or apparatus which allows conductive materials, including all types of metals, to be used as the binder. Thus, the selection of binder material is limited to non-conductive ones, such as polymeric materials which, relative to metals and ceramics, have lower strength. Also, the service temperatures of polymeric materials are limited to a few hundred degree Celsius beyond which, softening of thermoplastic polymers or degradation of thermosetting polymers will occur. Accordingly, the mechanical strength, heat resistance and other properties of said objects are dependent on those of the binder regardless of the body-building material used as the binder is solely responsible for holding the three-dimensional objects together.

While improvements have been made in the process, apparatus and materials for the development of three-dimensional objects, there continues to be a need for processes and apparatus which will improve the quality of the completed objects, are easy to use, simple in design, and cheap to purchase and run. In particular, there is a need for a process, where three-dimensional objects are formed layer-by-layer. Also, there is a need for a process, which is able to use a board array of materials, including both organic and inorganic substances as well as their mixtures, as the base material. Further, there is a need for the provision of a process for forming three-dimensional objects based on electrophotographic printing, where deformations found in completed three-dimensional objects caused by spillover effects of the building process are minimized by implementing a holistic approach in process planning Additionally, there is a need for a process for forming three-dimensional objects based on electrophotographic printing, where either conductive or non-conductive materials are used as the filler material, so that the selected filler has physical and chemical properties that are compatible with the base material, and there is obtained three-dimensional objects possessing attributes that are comparable to those produced by conventional manufacturing techniques, such as die-casting or CNC machining. Also, there is a need for a process, where the base powder is dispensed in such a manner that those not bonded during the build process, remain in the work space and serves as a support structure for ensuing layers.

SUMMARY OF THE INVENTION

It is therefore a feature of the present invention to provide a process of building three-dimensional objects based on electrophotographic printing which overcomes the above-noted disadvantages.

It is a further feature of the present invention to provide a process, wherein layers that constitute the three-dimensional objects are formed layer-by-layer and not point-by-point.

An additional feature of the present invention is the provision of a process, which allows the use of a board array of materials, including both organic and inorganic substances as well as their mixtures, as the base material.

Another feature of the present invention is the provision of a process with the flexibility to form layers constituting the three-dimensional objects with different thickness, so that the most appropriate configuration is selected for a given requirement.

Another feature of the present invention is the provision of a process, which allows the formation of objects with features that are not self-supporting, without the need of additionally generating a support structure.

An additional feature of the present invention is the provision of a process, where either conductive or non-conductive materials are used as the filler material, so that the selected filler has physical and chemical properties that are compatible with the base material.

A further additional feature of the present invention is the provision of an improved process, where deformations found in completed three-dimensional objects caused by spillover effects of the building process are minimized The present invention in one aspect is thus directed to a process for building three-dimensional objects, comprising the steps of depositing a layer of powdered base material onto a substrate; operating an imaging device to generate a electrostatic latent image on an imaging member having a surface capable of supporting and transporting filler material, wherein the electrostatic latent image corresponds to data derived from a selected cross-section of the three-dimensional object to be built; delivering a filler material to the surface of the imaging member to form a layer of filler material adjacent the electrostatic latent image thereon; heating the layer of filler material in a heating zone to a pre-determined temperature; transferring the layer of heated filler material from the surface of the imaging member to the layer of powdered base material to cause said layer of powdered base material to become bonded in regions corresponding to the electrostatic latent image; repeating all the above steps for as many times as required to form successive layers that constitute the three-dimensional object, said filler material further causing adjacent layers to be bonded with one another; and removing unbonded material to cause the three-dimensional object to appear.

DETAILED DESCRIPTION OF THE PREFERRED EMBODIMENT

These and other aspects of the present invention will become apparent from the following description in conjunction with the accompanying drawings in which.

In these Figures, like components are indicated by identical reference numerals.

Figure 1:
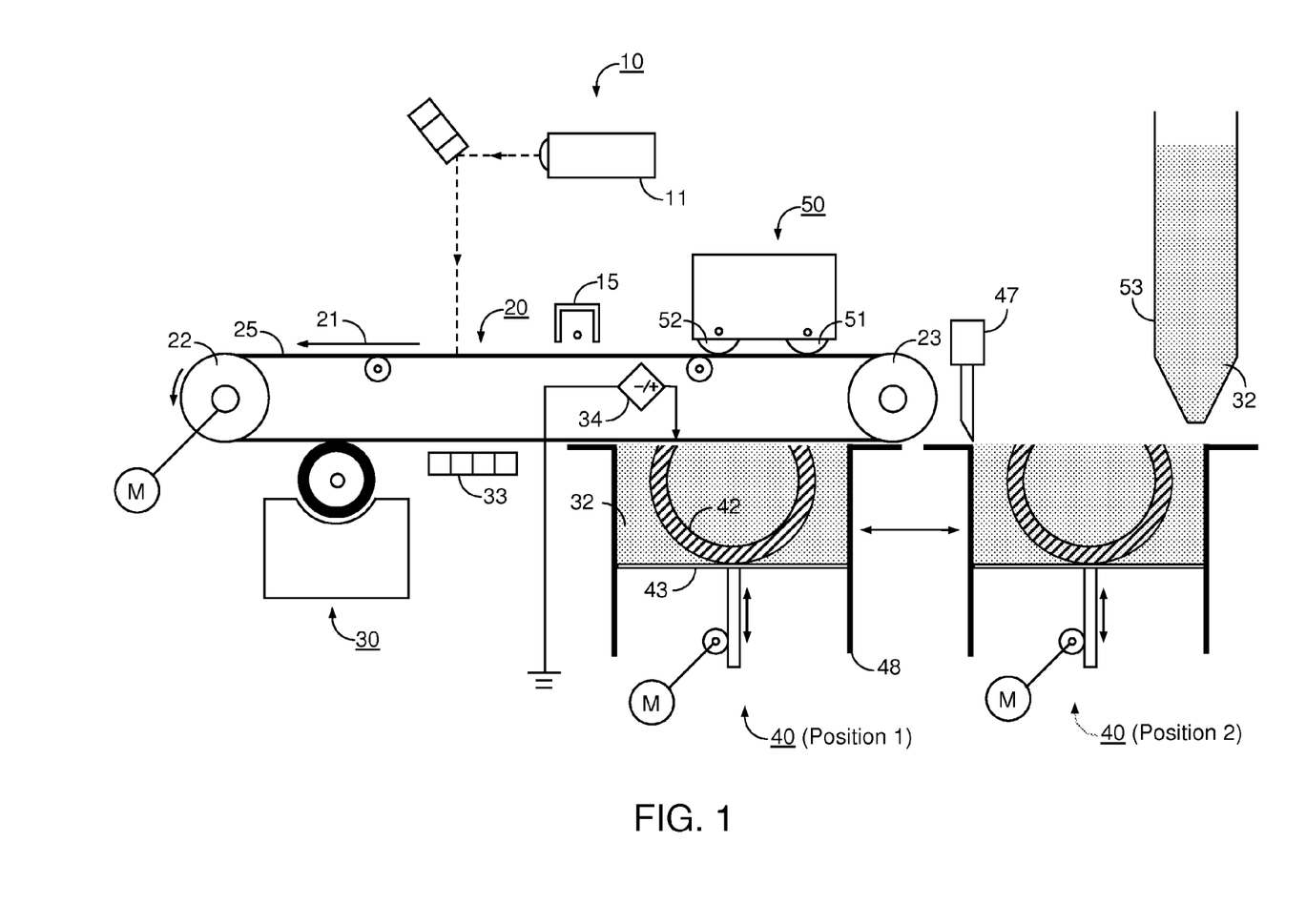
FIG. 1 is a schematic view of an embodiment of the process of the present invention.

Illustrated in FIG. 1 is an exemplary embodiment of the present invention which depicts an apparatus for forming three-dimensional objects, while FIG. 2A-2F show views of different stages of the forming process in accordance with the present invention. As shown in FIG. 2A-2D, the substrate 43, supporting the three-dimensional object 42, is moved beneath a powder dispensing means 53 to receive a layer of powdered base material 32 therefrom. The substrate 43, surrounded by the walls 48 of the build chamber 40, is lowered into a new position to create space 71 at the top of the build chamber 40 to receive said layer of powdered base material 32. Surplus powdered base material 32 is deposited to ensure that the entire preceding layer is completely and adequately covered with the powdered base material 32. The newly deposited layer of powdered base material 32 is then vibrated by a vibrating means, such as a vibrator (not shown), to promote settling thereof. It is preferred that the powdered base material 32 is vibrated to the point its volume becomes constant, so that further settling and unwanted movement of the powder layer is minimized and a stable platform for the deposition of subsequent layers is provided by the newly deposited layer of powdered base material 32. Excess powder is scrapped off by a doctor blade 47.

The exemplary apparatus further includes an imaging member 20, which forms a path around a drive roller 22 and an idler roller 23. The imaging member 20 is rotated in a process direction as indicated by arrow 21, so as to transport the surface 25 thereof around said path for implementing a series of image forming steps in a manner similar to typical electrophotographic printing processes. Imaging member 20 includes an imaging surface 25 of any type capable of having an electrostatic latent image formed thereon. An exemplary imaging member 20 may include a typical photoreceptor or other photoreceptive component of the type known to those in the art of electrophotography, that comprises an inner layer composed of an electrically conductive material with an outer photoconductive layer thereupon. The inner layer of the photoreceptor may be impervious to light, or wholly or partially transparent. Mylar, with an overcoat of indium tin oxide, for example, is suitable as a transparent inner layer for the photoreceptor. Likewise, the photoconductive layer may be impervious to light, or wholly or partially transparent. Polyvinyl carbazole, which is light-transmissive and possesses high dark-resistivity, is suitable as a transparent photoconductive layer, for example. Alternative embodiments for the imaging member 20 are also contemplated by the present invention, including, for example, but not limited to, non-photosensitive imaging members such as a dielectric charge retaining member of the type common in ionographic printing apparatuses or electrode substructures capable of generating electrostatic latent images.

Referring to the exemplary embodiment of FIG. 1, the photoconductive surface 25 of the imaging member 20 is advanced to a charging device 15, which may include a corona generating device, or any other charging apparatus capable of applying an electrostatic charge on the surface 25 of the imaging member 20. At the corona generating device, the photoconductive surface 25 is charged to a relatively high, substantially uniform potential. Thereafter, the charged surface 25 of the imaging member 20 is advanced to an image generating device 10, which projects a light image corresponding to input data onto the charged photoconductive surface 25 to selectively dissipate the charge thereon. An electrostatic latent image is thus formed on the photoconductive surface 25. The image generating device 10 may include various optical image formation and projection devices as are known in the art, such as laser 11, which is exemplified herein.

After the electrostatic latent image is formed on the photoconductive surface 25 of the imaging member 20, the image is advanced to an image developing device 30 and developed into a visible image by delivering charged filler powdered material thereon and allowing the electric fields emanating from both charged filler powder and electrostatic latent image to interact and causing said charged filler powder to imagewise deposit on the imaging member 20. Generally, any of the large number of imaging developing devices known in the art is suitable for delivering and depositing filler material to the photoconductive surface 25 of the imaging member 20. Illustrative examples of the imaging developing devices include magnetic brush systems, which deposit developing material on the imaging member by contacting a brush-like mass composed of ferromagnetic material formed by the effects of magnetism, and loaded with charged developing material, with the imaging member, powder cloud systems, which deposit developing material on the imaging member by delivering the developing material to the imaging member as a spray, so that charged developing material therein are attracted to the electrostatic latent image on the photoconductive surface, and cascade systems, which transport developing material to the imaging member by causing the developing material to traverse the surface of the imaging member in a cascading manner.

After filler material is deposited on the photoconductive surface 25 of the imaging member 20, the imaging member 20 advances to a source of energy 33 where the filler material thereon is heated thereby. The energy source 33 may include a resistive heating element, which is exemplified herein, or any other devices capable of suitably heating the filler material transported on the imaging member 20. Examples of devices capable of suitably heating the filler material, which is composed of either conductive or non-conductive substances, include cavity magnetrons, which cause heating of dielectric substances by exciting the molecules thereof with microwave radiation, and induction coils, which cause heating of conductive substances by inducing eddy currents in the conductive substances, among other devices, which are known in the art.

Figure 2A:
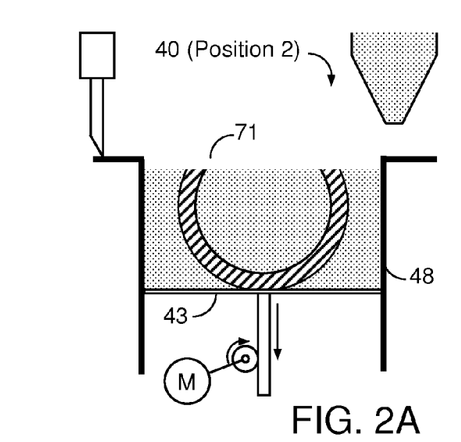
FIG. 2A-2F are schematic views of different stages of forming a three-dimensional object in accordance with the present invention.
Figures 2B, 2C:
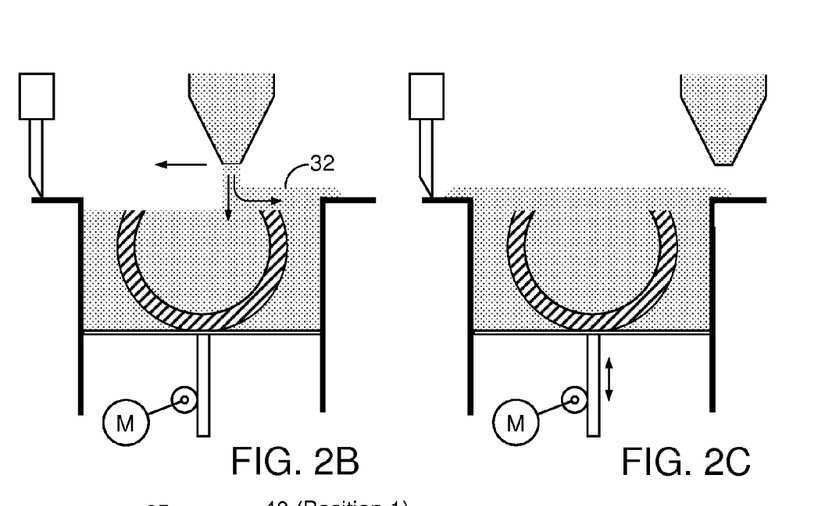
Figure 2D:
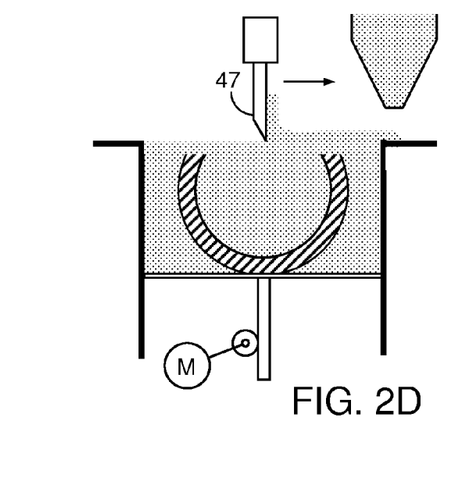
Figure 2E:
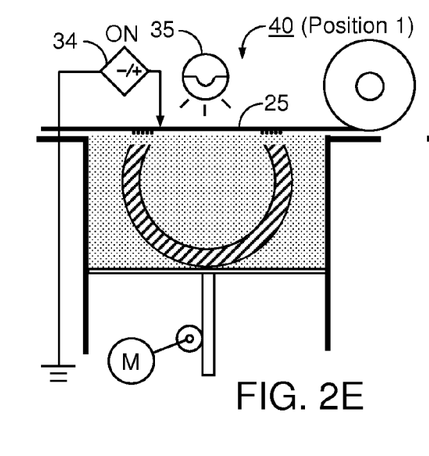
Figure 2F:
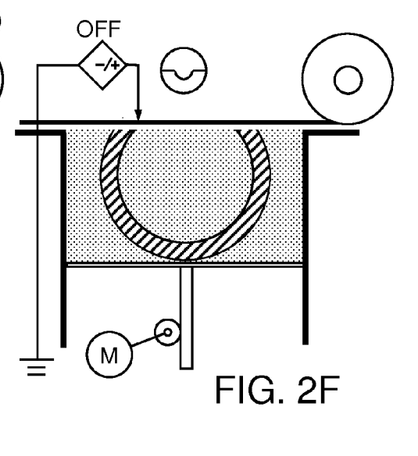

Once the filler material deposited on the electrostatic latent image formed on the imaging member 20 is heated to a pre-determined temperature, it is transported directly overhead the present layer of the three-dimensional object 42 being formed. Generally, the spacing between the newly deposited layer of powdered base material 32 in the build chamber 40 and the imaging member 20 ranges from about 100 µm to several millimeters. A discharge lamp 35 floods the photoconductive surface 25 of imaging member 20 from its reverse side with light to dissipate all the electrostatic charge held thereon (FIG. 2E). While discharge lamp 35 is illustrated as shining on the interior of the imaging member 20, it will be understood that in the case where the imaging member 20 is impervious to light, the discharge lamp 35 will be positioned to shine on the exterior of the imaging member 20. As a large number of closely adjacent filler particles having the same charge polarity are originally held on the surface 25 of the imaging member 20, an unstable condition thereon is thus created. Owing to the mutual repulsion of these particles, a large portion of said particles is ejected from the surface 25 of the imaging member 20 and deposits in an image-wise manner on the current layer of the three-dimensional object 42 being formed, thereby causing the powdered base material 32 at such regions to become bonded (FIG. 2F). The filler material also causes adjacent layers of the base powder 32 to be bonded with one another.

The repulsion of the charged filler particles from the surface 25 of the imaging member 20 may be improved by connecting the inner layer of the imaging member 20 to a voltage source 34 equal in polarity to that of the filler particles rather than merely grounding the conductive layer. In this manner, the repulsive force emanating from the conductive inner layer is added to the force of mutual repulsion between the filler particles, thereby propelling them into the newly deposited layer of base powder 32 with greater velocity and uniformity. This may be accomplished by operating a controllable voltage source.

Figure 3:
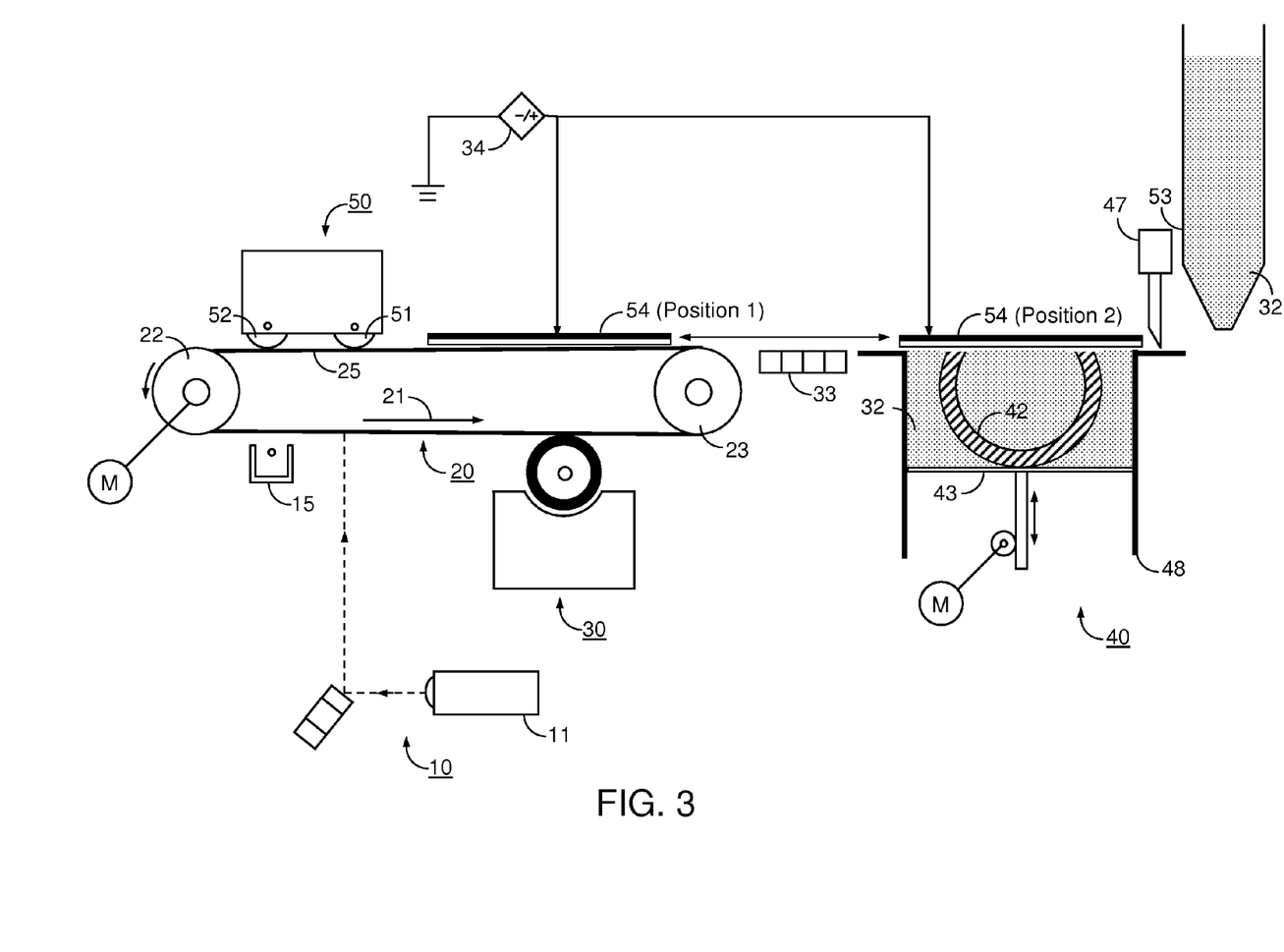
FIG. 3 is a schematic view of another embodiment of the process of the present invention.
Figure 4:
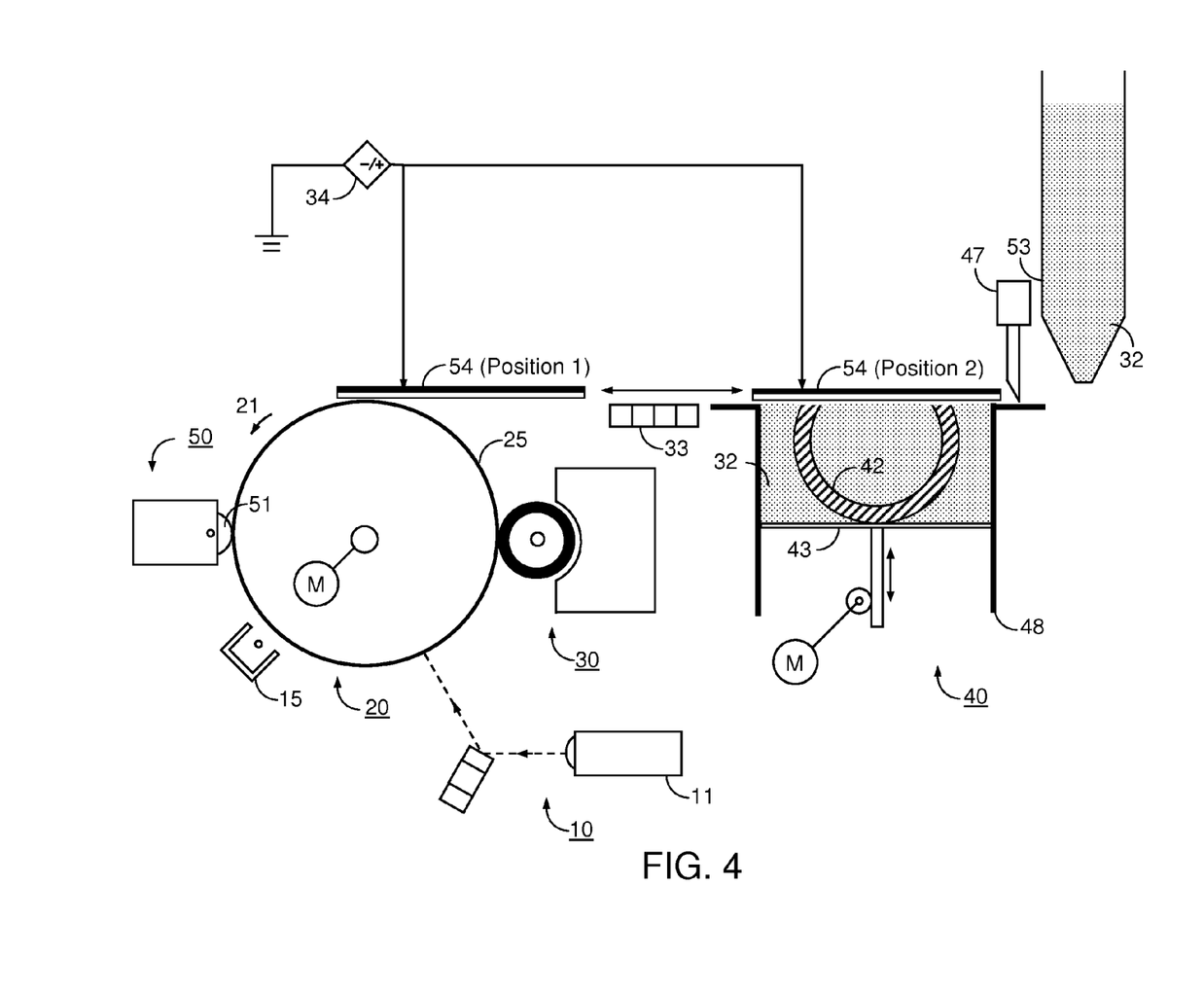
FIG. 4 is a schematic view of a further embodiment of the process of the present invention.

According to the exemplary embodiment of FIG. 1, the filler material is heated by a source of energy 33 after it is deposited on the photoconductive surface 25 of the imaging member 20. Due to the proximity of the imaging member 20 to the energy source 33, the imaging member 20 is also exposed to the energy source 33 during the heating process and heats up. In the case where the imaging member's 20 operating temperature is exceeded, the imaging member 20 may lose its insulating characteristic and become inoperable. Thus, the present invention contemplates an alternative embodiment to the process of heating the filler material whilst it is being transported on the imaging member 20, wherein the effects of the energy source 33 on the imaging member 20 is minimized Illustrated in FIGS. 3 and 4 are other embodiments of the process of the present invention which minimize the effects of the energy source 33 on the imaging member 20. The operation of the process as illustrated in FIG. 3 is substantially identical to the operation of the process as illustrated in FIG. 4. The key difference between the embodiments as illustrated in FIG. 3 and FIG. 4 being that a flexible imaging member is provided in the former whereas a rigid one is provided in the later. In these versions of the process of the present invention, in summary, a first layer of powdered base material 32 is deposited on a substrate 43. An imaging member 20 is operated so as to transport the photoconductive surface 25 thereon for implementing a series of imaging forming steps. A charging device 15 charges the photoconductive surface 25 to a relatively high, substantially uniform potential. The imaging member 20 then advances to the image generating device 10, where the charges on the photoconductive surface 25 are selectively dissipated to form a latent electrostatic image thereon. An image developing device 30 is, in turn, operated to develop the latent electrostatic image into a visible image by depositing powdered filler material on the imaging member 20 in an image-wise manner. As contrasted to FIG. 1, the imaging member 20 is not used to transport the newly developed layer of filler material thereon to the energy source 33. Instead, a heat-resistant donor member 54, illustrated herein as a platen, is used to transport the layer of filler material to the source of energy 33, where the layer of filler material is heated to a pre-determined temperature, after receiving the layer of filler material from the imaging member 20. While the donor member 54 is illustrated herein as a platen, other configurations, such as a roll, or a continuous flexible belt, is also contemplated by the present invention. Additionally, the donor member 54 is comprised of any material, or combination of materials, which allow(s) the donor member to be charged to a desired polarity, either positive, or negative, and magnitude. Preferably, the donor member 54 comprises a conductive inner layer with an overcoat of an insulating material. This particular configuration is useful in preventing charges from flowing between the filler particles and the donor member 54, so that the filler particles will remain bound in position on the donor member 54. The transfer of the layer of filler material from the imaging member 20 to the donor platen 54 is carried out by connecting the donor platen 54 to a voltage source 34, illustrated herein as a controllable voltage source, opposite in polarity to that of the filler particles, and charging the donor platen 54 to a magnitude at least sufficient to overcome the attractive electrostatic forces existing between the latent electrostatic image and the filler particles.

Once the filler material transferred to the donor platen 54 is heated to a pre-determined temperature, it is transported directly overhead the present layer of the three-dimensional object 42 being formed. Generally, the spacing between the newly deposited layer of powdered base material 32 in the build chamber 40 and the donor platen 54 ranges from about 100 µm to several millimeters. The controllable voltage source 34 then switches to the same polarity as the filler particles. As a result of mutual repulsion between the donor platen 54 and the filler particles, the filler particles are propelled from the surface of the donor platen 54, and deposit in an image-wise manner on the current layer of the three-dimensional object 42 being formed, thereby causing the powdered base material 32 at such regions to become bonded. The filler material also causes adjacent layers of the base powder 32 to be bonded with one another.

The heated filler material may cause bonding of the newly deposited layer of powdered base material 32 in several ways. In one exemplary embodiment, the filler material is heated until it is partially or completely molten. Also, the base material 32 is selected so that its melting point is the same as or less than the boiling point of the filler material. Accordingly, once the filler material comes into contact with the layer of powdered base material 32, it permeates into the gaps existing in between the particles thereof. As the temperature of the molten filler material is the same as or higher than the melting point of the base material 32, the outermost layer of the particles of the base material melts, and upon solidification, coalesces at their contacting surfaces. The filler material is incorporated into the final component.

In the above-described process, the image-wise bonding of the newly deposited layer of powdered base material 32 is accomplished by the melting and subsequent coalescence of the base material 32. Thus, the selection of base materials 32 is limited to those with a melting point that is less than or the same as the boiling point of the filler material. To expand the range of materials that can be selected as the base material 32, the present invention contemplates an alternative embodiment to the bonding process via coalescence of the base material 32 described hereinabove, wherein no melting of the base material 32 is required. In this alternative embodiment, the image-wise bonding of the newly deposited layer of powdered base material 32 is carried out using only the filler material. This embodiment operates in a manner similar to the above-described embodiment, wherein the filler material is either partially or completely melted and allowed to permeate the newly deposited layer of powdered base material 32. However, the base material 32 is not melted and the bonding thereof is provided by the solidification of the filler material.

After the filler material is transferred from the photoconductive surface 25 of the imaging member 20 to the newly deposited layer of base powder 32, some residual particles inevitably remain adhering thereto. These residual particles are removed from the photoconductive surface 25 at cleaning station 50. The particles are cleaned from the photoconductive surface 25 by the rotation of brush 51 and 52 in contact therewith. Subsequent to cleaning, a discharge lamp (not shown) floods the photoconductive surface 25 of the imaging member 20 with light to dissipate any residual electrostatic charge remaining thereon prior to the charging thereof for the next successive imaging cycle.

All the above steps are repeated for as many times as required to form successive layers that constitute the three-dimensional object 42. After the three-dimensional object 42 is completed, unbonded material is removed to cause the three-dimensional object to appear.

The present invention contemplates the use of either conductive or non-conductive materials as the filler material. Generally, the various known image developing systems that are extensively used in electrophotographic devices, including those described hereinabove, employs non-conductive developing material, which is normally charged by triboelectric charging. When it is desired to utilize conductive filler material, the filler material may be charged by, for example, induction, using the development methods as described in U.S. Pat. No. 3,166,432. To transfer conductive filler material from the surface 25 of the imaging member 20 to the newly deposited layer of base powder 32, the method described hereinabove, wherein the transfer is carried out by flooding the photoconductive surface 25 with light to dissipate the electrostatic charge found thereon, so that charged filler particles eject from the surface 25 of the imaging member 20 as a result of mutual repulsion, cannot be followed. The photoconductive surface 25 becomes conductive when exposed to light, which causes the charged conductive filler particles thereon to lose their charge. Once the conductive filler particles are neutralized, the repulsive force existing between the filler particles is also lost, and the filler particles may continue adhering to the surface 25 of the imaging member 20 due to van der Waals forces. Thus, to transfer conductive filler material from the surface 25 of the imaging member 20 to the newly deposited layer of base powder 32, the imaging member 20 is electrically biased by a voltage source 34 to the same polarity as that of the filler material, and to a magnitude greater than that of both the image and non-image areas of the electrostatic latent image on the imaging member 20, so that the filler particles are electrostatically propelled to the newly deposited layer of base powder 32. After the filler particles are transferred to the newly deposited layer of base powder 32, the imaging member 20 is flooded with light to dissipate the latent electrostatic image thereon to prevent the image from interfering with the newly formed layer of base and filler powders.

Materials suitable for the base material 32 may include, for example, but not limited to, metals, ceramics, polymers and composites. Examples of metals include ferrous metals, non-ferrous metals, their alloys and superalloys such as carbon steels, stainless steels, aluminum alloys, titanium alloys and the like. Examples of ceramics include oxide ceramics, carbides, and nitrides such as alumina, silicon carbide, titanium nitride and the like. Examples of polymers include thermoplastic polymers and thermosetting polymers such as acrylics, ABS, polyamides, polyethylene and the like.

Materials suitable for the filler material included metals with low-melting point and thermoplastic polymers. Metals with low-melting point include alloys of tin and lead.

Many possible combinations of base and filler materials can be selected according to the present invention. For example, metal powders can be bonded with either thermoplastic polymers or metals; ceramic powders can be bonded with thermoplastic polymers; and thermoplastic polymeric powders can be bonded with thermoplastic polymers.

Other modifications of the present invention will occur to those skilled in the art upon reading of the present disclosure. These are intended to be included within the scope of the present invention.

The invention claimed is:

1. A process for building three-dimensional objects, comprising the steps of
    (1) depositing a layer of powdered base material on a substrate;
    (2) operating an imaging device to generate a electrostatic latent image on an imaging member having a surface capable of supporting and transporting filler material, wherein the electrostatic latent image corresponds to data derived from a selected cross-section of a three-dimensional object to be built;
    (3) delivering a filler material to the surface of the imaging member to form a layer of filler material adjacent the electrostatic latent image thereon;
    (4) heating the layer of filler material in a heating zone;
    (5) transferring the layer of heated filler material from the surface of the imaging member to the layer of powdered base material to cause said layer of powdered base material to become bonded in regions corresponding to the electrostatic latent image;
    (6) repeating all the above steps for as many times as required to form successive layers that constitute the three-dimensional object, said filler material further causing adjacent layers to be bonded with one another; and
    (7) removing unbonded material to cause the three-dimensional object to appear.

2. A process in accordance with claim 1, wherein said step of transferring the layer of filler material from the imaging member is performed by removing the electrostatic latent image on the imaging member, so that the particles of the filler material are mutually repelled by the likeness of their charge and deposit on the layer of powdered base material.

3. A process in accordance with claim 2, wherein said step of transferring the layer of filler material from the imaging member, further including the step of applying a force repelling said filler material from the imaging member in addition to their mutual repelling forces during, before, or after removing the electrostatic latent image.

4. A process in accordance with claim 2, wherein said imaging member is positioned approximately 100 μm to several millimeters from said layer of powdered base material.

5. A process in accordance with claim 2, wherein said filler material is an insulating material.

6. A process in accordance with claim 1, wherein said step of transferring the layer of filler material from the imaging member, including applying a force repelling said filler material from the imaging member.

7. A process in accordance with claim 6, wherein said imaging member is positioned approximately 100 μm to several millimeters from said layer of powdered base material.

8. A process in accordance with claim 6, wherein said filler material is a conductive material.

9. A process for building three-dimensional objects, comprising the steps of
    (1) depositing a layer of powdered base material on a substrate;
    (2) operating an imaging device to generate a electrostatic latent image on an imaging member having a surface capable of supporting and transporting filler material, wherein the electrostatic latent image corresponds to data derived from a selected cross-section of a three-dimensional object to be built;

(3) delivering a filler material to the surface of the imaging member to form a layer of filler material adjacent the electrostatic latent image thereon;

(4) transferring the newly formed layer of filler material from the surface of the imaging member to a donor member;

(5) heating the layer of filler material in a heating zone;

(6) transferring the layer of heated filler material from the surface of the donor member to the layer of powdered base material to cause said layer of powdered base material to become bonded in regions corresponding to the electrostatic latent image;

(7) repeating all the above steps for as many times as required to form successive layers that constitute the three-dimensional object, said filler material further causing adjacent layers to be bonded with one another; and (8) removing unbonded material to cause the three-dimensional object to appear.

10. A process in accordance with claim 9, wherein said step of transferring the layer of filler material from the imaging member is performed by applying a force to attract said filler material to the donor member.

11. A process in accordance with claim 9, wherein said step of transferring the layer of filler material from the donor member is performed by applying a force repelling said filler material therefrom.

12. A process in accordance with claim 10 or 11, wherein said attracting force and repelling force are electrostatic forces.

13. A process in accordance with claim 9, wherein said donor member is provided with a reversible polarity electric biasing means to initially attract and hold like charged filler particles by a first polarity and subsequently to release said particles by a second polarity.

14. A process in accordance with claim 9, wherein said donor member is positioned approximately 100 µm to several millimeters from said layer of powdered base material.

15. A process in accordance with claim 9, wherein the donor member is flexible or rigid.

16. A process in accordance with claim 9, wherein the donor member is comprised of a conductive inner layer and an insulating outer layer.

17. A process in accordance with claim 1 or 9, wherein the imaging member is flexible or rigid and is selected from inorganic compositions or organic compositions.

18. A process in accordance with claim 1 or 9, wherein said electrostatic latent image generating step includes:

(1) charging a photosensitive imaging substrate; and (2) selectively dissipating the charge on the photosensitive imaging substrate in accordance with data derived from a selected cross-section of a three-dimensional object to be built.

19. A process in accordance with claim 18, wherein said photosensitive imaging substrate is impervious to light.

20. A process in accordance with claim 18, wherein said photosensitive imaging substrate is at least partially transparent to light.

21. A process in accordance with claim 1 or 9, wherein said electrostatic latent image generating step includes selectively depositing electrical charge on a dielectric imaging member in accordance with data derived from a selected cross-section of a three-dimensional object to be built.

22. A process in accordance with claim 1 or 9, wherein said deposition step includes:

(1) depositing a surplus amount of powdered base material;

(2) vibrating the powdered base material to promote settling thereof; and (3) operating a leveling device, which simultaneously levels the deposited layer and removes surplus powdered base material.

23. A process in accordance with claim 1 or 9, wherein said base material is a metal, ceramic, polymer, or composite, and said filler material is an inorganic material, an organic material, or a metallic material.

24. A process in accordance with claim 1 or 9, wherein said filler material is at least partially melted after being heated.

25. A process in accordance with claim 24, wherein said bonding step is performed by allowing the at least partially melted filler material to permeate into the gaps existing in between the particles of the layer of powdered base material and coalesce with the base material.

26. A process in accordance with claim 25, wherein said base material is at least partially melted.

27. A process in accordance with claim 25, wherein both said filler material and base material at least partially harden after being applied.

28. A process in accordance with claim 24, wherein said bonding step is performed by allowing the at least partially melted filler material to permeate into the gaps existing in between the particles of the layer of powdered base material and bond the base material together.

29. A process in accordance with claim 28, wherein said base material is not melted.

30. A process in accordance with claim 28, wherein said filler material at least partially hardens after being applied.

31. A process in accordance with claim 1 or 9, wherein said filler material is not melted after being heated.

* * * * *